(12) United States Patent
Daby et al.

(10) Patent No.: US 6,563,669 B1
(45) Date of Patent: May 13, 2003

(54) INVERTED WRITE HEAD WITH HIGH-PRECISION TRACK WIDTH DEFINITION

(75) Inventors: Larry E. Daby, Erie, CO (US); James C. Cates, Superior, CO (US); John P. Biesecker, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 195 days.

(21) Appl. No.: 09/660,662

(22) Filed: Sep. 13, 2000

(51) Int. Cl.⁷ .......................... G11B 5/147; G11B 5/187
(52) U.S. Cl. ...................................................... 360/126
(58) Field of Search ................... 360/317, 122, 360/126

(56) References Cited

U.S. PATENT DOCUMENTS

| | | | |
|---|---|---|---|
| 5,652,687 A | | 7/1997 | Chen et al. ................... 360/126 |
| 5,719,730 A | | 2/1998 | Chang et al. ................ 360/122 |
| 5,831,801 A | * | 11/1998 | Shouji et al. ................ 360/126 |
| 5,894,389 A | | 4/1999 | Kanamine .................... 360/126 |
| 6,055,138 A | | 4/2000 | Shi ............................. 360/126 |
| 6,072,670 A | * | 6/2000 | Furuichi et al. ............. 360/126 |
| 6,118,629 A | * | 9/2000 | Huai et al. ................... 360/126 |
| 6,130,809 A | * | 10/2000 | Santini ........................ 360/126 |
| 6,172,848 B1 | * | 1/2001 | Santini ........................ 360/122 |
| 6,296,776 B1 | * | 10/2001 | Sasaki ........................... 216/22 |

FOREIGN PATENT DOCUMENTS

EP      10 021508      1/1998

* cited by examiner

Primary Examiner—Jefferson Evans
(74) Attorney, Agent, or Firm—Brooks & Kushman P.C.

(57) ABSTRACT

A method of fabricating a thin film magnetic transducer and the resulting transducer structure is disclosed. The method starts with the formation of a bottom pole having an upper portion and a lower portion in a zero throat region. The upper portion has an upper portion width and the lower portion had a lower portion width, wherein the lower portion width is greater than the upper portion width. A gap layer is then formed over the bottom pole, and the top pole is formed over the gap layer. The top pole width is greater than the bottom pole's lower portion width. In one embodiment, a planarization layer is deposited overlaying the bottom pole prior to formation of the gap layer. Lapping is then performed to reduce the planarization layer and the bottom pole's upper portion to a flat surface suitable for receiving the gap layer deposition.

4 Claims, 4 Drawing Sheets

INVERTED WRITE HEAD WITH HIGH-PRECISION TRACK WIDTH DEFINITION

TECHNICAL FIELD

The present invention is related to the field of thin filmed magnetic write transducer structures and methods of fabrication.

BACKGROUND ART

Magnetic storage media uses increasingly narrower track widths to increase the amount of data that can be recorded per square inch. Narrow track widths require tight control of the dimension and shape of the magnetic transducer's poles near and at a write gap. As the magnetic write transducer and magnetic media move relative to each other, it is generally the trailing pole of the magnetic write transducer that determines the effective size of the track width written in the magnetic media.

Two widely used methods of controlling pole width and pole sidewall profiles during wafer fabrication are electroplating and ion milling. Optically patterned photoresist layers produce well defined, steep sidewall profiles that make excellent electroplating templates. In an electroplating process, an electrically conductive seedlayer is deposited on the wafer before the photoresist. The photoresist is then deposited, exposed, and developed. Plating is then performed with the seedlayer carrying the plating current. After plating, the photoresist is stripped and a quick etch removes the unwanted areas of the seedlayer. A drawback to this process is that the plated poles tend to be softer than vacuum deposited poles. This results in a shorter life span for thin film magnetic heads in tape applications where the poles wear against the magnetic tape medium causing pole tip recession.

Vacuum deposited poles can be made of harder materials thus resulting in a longer life span for the thin film magnetic write transducer. A problem with vacuum deposited poles, however, is controlling the size and shape of the top pole. The magnetic material used to create the top pole is usually deposited to a thickness of three to five micrometers. Chemical etching of unwanted material is generally quick and simple to perform, but results in sloped sidewalls and average control of the top pole's longitudinal width. Precision removal of unwanted material at these thicknesses generally requires ion or focused electron beam milling. These techniques can produce steep sidewalls with good longitudinal dimension control. However, ion milling through five microns of a hard material can be time consuming and expensive. Furthermore, control of the dimensions at the bottom of the layer being milled decreases as ion milling depth increases.

A variation on ion milling during wafer level fabrication is to perform the milling at the device level. Individual transducers, or arrays of transducers, are fabricated and then cut from the wafer. The side of the transducers that is to become the air bearing surface (in magnetic disk applications) or tape bearing surface (in magnetic tape applications) is then polished to produce the media (tape or air) bearing surface. Ion milling takes place into the media bearing surface to trim the top pole, and usually part of the bottom pole adjoining the write gape. Voids left by the ion milling are filled in tape media applications, and left open in environmentally sealed magnetic disk drive applications. Here, the milling can be shallower than cutting through the entire top pole layer giving better dimensional control.

Media bearing surface milling can also be performed over a small area resulting in less debris being redeposited elsewhere. However, handling each individual/array of magnetic transducers for milling is time consuming and expensive. Furthermore, errors in the milling process that results in scrapping of the magnetic transducers occur after many other fabrication steps have been completed. Scrapping a transducer at this point is costly.

DISCLOSURE OF INVENTION

The present invention is a method of fabrication, and the resulting structure for a thin film magnetic transducer having two poles separated by a gap. A bottom pole and top pole are fabricated where the longitudinal dimension of the bottom pole is smaller than the top pole in a zero throat region resulting in an "inverted" structure, as compared with convention designs. An upper portion of the bottom pole is ion milled in at least the zero throat region early in wafer-level fabrication to produce a precise width adjoining the gap layer. The trimmed upper pole portion of the bottom pole results in an improved write pole geometry that produces tightly defined data tracks.

In a preferred embodiment, a planarization layer is deposited over the bottom pole after patterning of the bottom pole is complete. This planarization layer is then lapped to expose the underlying bottom pole. Lapping may also remove part of the upper portion of the bottom pole. Partial removal of the upper portion reduces the effective thickness of the upper portion from a target upper portion thickness to a final upper portion thickness.

Accordingly, it is an object of the present invention to provide a method for fabricating a magnetic transducer, and resulting magnetic transducer structure wherein the top pole is wider than the bottom pole, and the bottom pole has an even narrower upper portion adjoining the gap layer that controls track width.

These and other objects, features and advantages will be readily apparent upon consideration of the following detailed description in conjunction with the accompanying drawings.

BEST MODE FOR CARRYING OUT THE INVENTION

Several terms are used in this document in a generic sense. The term "forming" is meant to include any combination of fabrication steps that result in the deposition and patterning of a layer. This includes depositing a layer followed by a subsequent patterning using a masking layer to control the removal of unwanted material. It also includes the deposition of a patterning mask layer used to control a subsequent deposition. The term "deposition" is any method of creating a layer of material over the existing surface. Deposition includes sputtering, evaporation, chemical vapor deposition, plating and other like methods known in the art. The term "patterning" is any method of defining a geometric area or areas where a layer will and will not exist, or will exist in a thinner form. Patterning includes wet chemical etching, electrochemical machining, lift off techniques, ion milling, focused ion beams and other like methods used in the art.

Figure 1A:
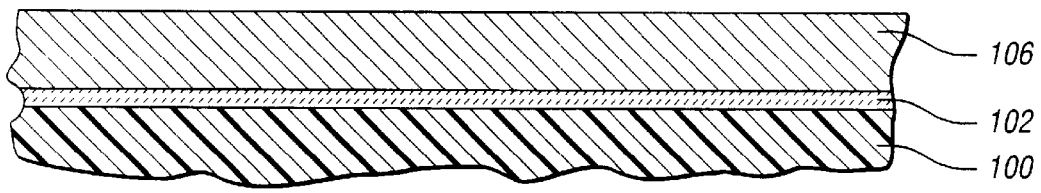
FIGS. 1a, 1b, and 1c illustrate a first sequence of fabrication steps for forming a magnetic tranducer's bottom pole.
Figure 2:
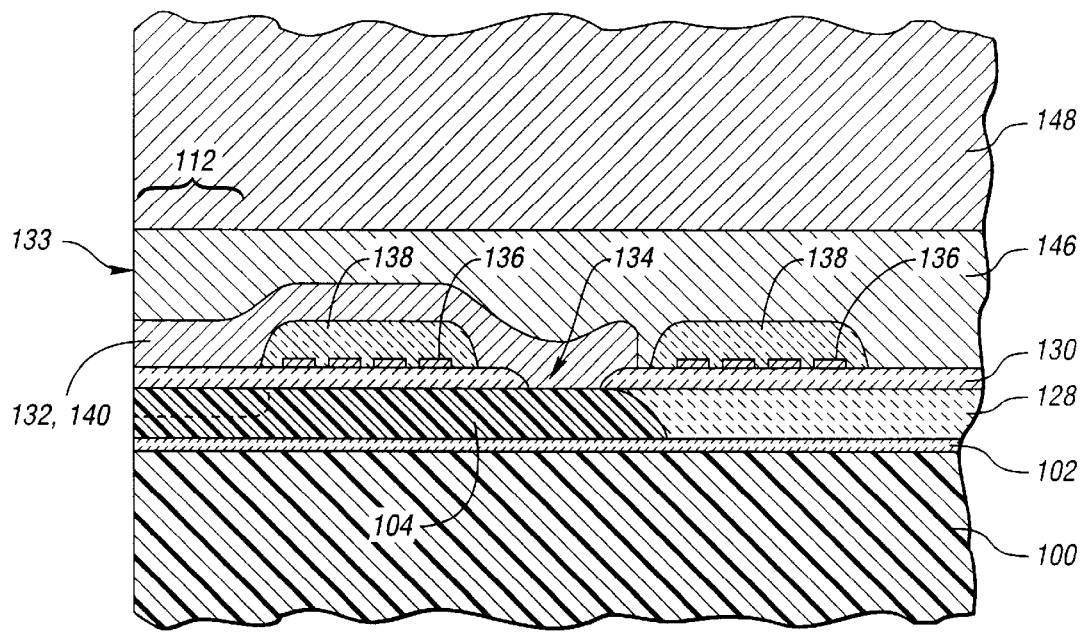
FIG. 2 is a profile of the thin film magnetic transducer as seen perpendicular to a media bearing surface.

Referring to FIG. 1A and FIG. 2, the process for fabricating a thin film magnetic transducer in accordance with the present invention begins with cleaning a starting or base layer. The base layer may be a wafer substrate 100, an undercoat layer 102 deposited on the wafer substrate 100, or other layer of material. The undercoat layer 102 may be an electrically insulating material such as alumina or other suitable material. A lapping strap seedlayer (not shown) is then formed on the base layer to produce resistive elements. The lapping strap seedlayer is used later in the process to monitor the progress of a final lapping step. Seedlayers are very thin electrically conductive layers usually on the order of 800 to 1000 angstroms thick.

A bottom pole 104 is formed following the formation of the lapping strap seedlayer. The bottom pole 104 is started by depositing a bottom pole layer 106 of magnetic material overlaying the undercoat layer 102, or other base layer. In the preferred embodiment, deposition is by vacuum deposition followed by an annealing. A preferred material for the bottom pole layer 106 is a cobalt zirconium tantalum (CZT) alloy deposited to a thickness of approximately three to five micrometers. Various nickle iron alloys, such as 45:55 NiFe and 50:50 NiFe, iron nitride alloys, and nickle iron nitride alloys may also be used in place of the CZT layer.

Figure 1B:
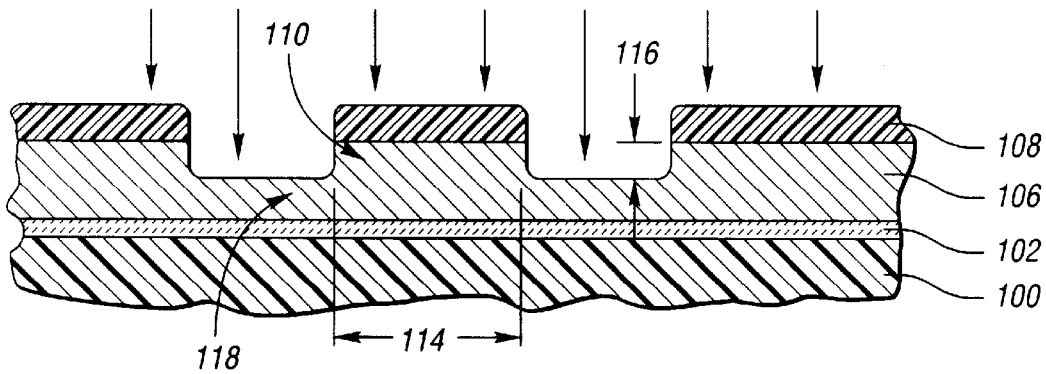

Referring to FIG. 1B, a photoresist mask 108 is deposited, exposed, and developed overlaying the bottom pole layer 106. Ion milling is then performed using the photoresist mask 108 to shield areas of the bottom pole layer 106 that are not to be milled. In particular, an upper portion 10 in what will be part of a zero throat region 112 (see FIG. 2) of the magnetic transducer is protected by the photoresist mask 108 from milling. This upper portion 110 has an upper region width in a longitudinal direction, as indicated by arrow 114, that will ultimately control the track width on a magnetic media (not shown). Ion milling is performed to produce an upper portion thickness, as indicated by arrow 116, having a target value. A remainder layer 118 of the bottom pole layer 108 is left unmilled around the upper portion 110. After ion milling, the photoresist mask 108 is stripped.

Figure 1C:
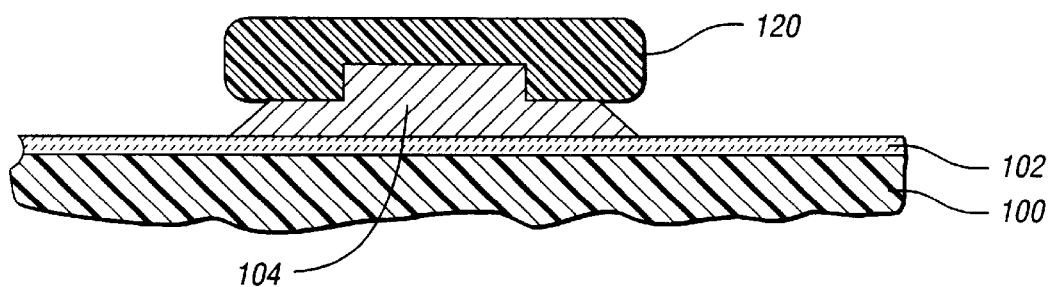
Figure 3:
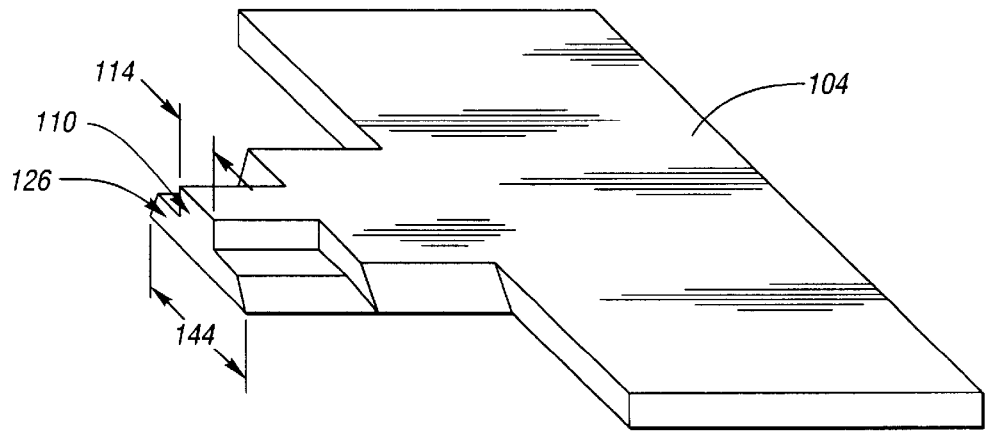
FIG. 3 is a perspective view of the bottom pole.

Referring to FIG. 1C, a second photoresist mask 120 is deposited, exposed and developed overlaying the bottom pole layer 106. Second photoresist mask 120 covers the upper portion 110 and slightly overlaps the remainder layer 118 immediately adjoining the upper portion 110. An etch is them performed through the second photoresist mask 120 to remove unwanted areas of remainder layer 118. This leaves each bottom pole 104 isolated from its neighbors. After the second photoresist mask 120 is stripped, the resulting bottom pole 104 appears as shown in FIG. 3.

In one alterative embodiment, the ion milling may be performed around the entire perimeter of the bottom pole 104, instead of just in the zero throat region 112. Furthermore, the ion milling shown in FIG. 1B may be continued until the entire thickness of the bottom pole layer 108 is milled. This makes the second photoresist mask 120 and subsequent etching step shown in FIG. 1C unnecessary.

Figure 4A:
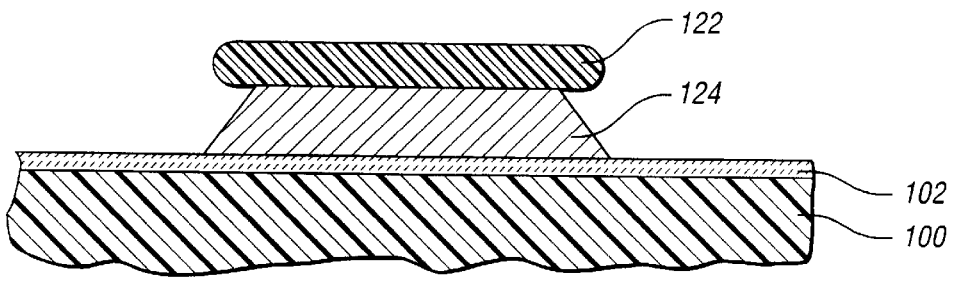
FIGS. 4a and 4b illustrate a second sequence of fabrication steps for forming the magnetic transducer's bottom pole.
Figure 4B:
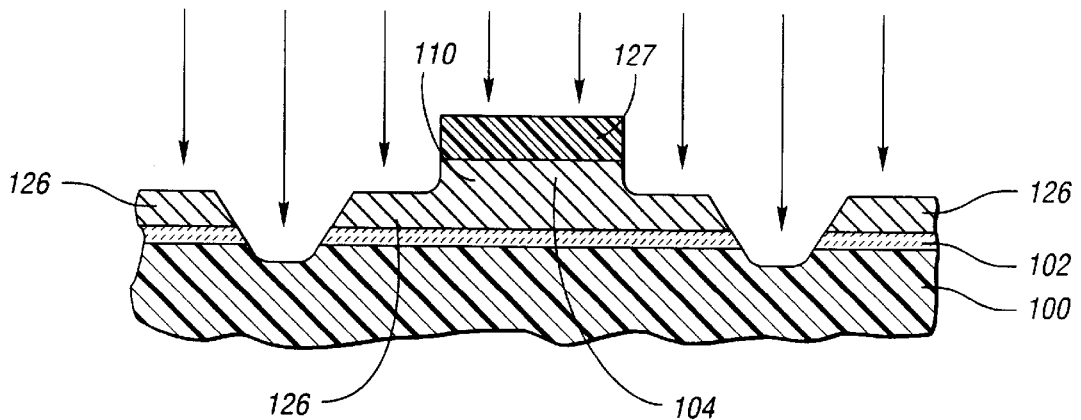

An alternative approach to forming the bottom pole 104 is shown in FIG. 4. Here, as before, the process begins with the deposition of the bottom pole layer 106, as was shown in FIG. 1A. An initial photoresist mask 122 is deposited, exposed, and developed over the bottom pole layer 106, as shown in FIG. 4A. An etch is then performed on the bottom pole layer 106 through the initial photoresist mask 122. All of the unwanted areas of the bottom pole layer 106 are removed by the etch leaving an intermediate bottom pole 124 behind. Another photoresist mask 127 is then formed over the intermediate bottom pole 124, as shown in FIG. 4B. The photoresist mask 126 distinguishes the upper portion 110 of the bottom pole 104 from a lower portion 126 of the bottom pole 104. An ion milling is then performed to pattern the intermediate bottom pole 124 into a complete bottom pole 104.

Figure 5A:
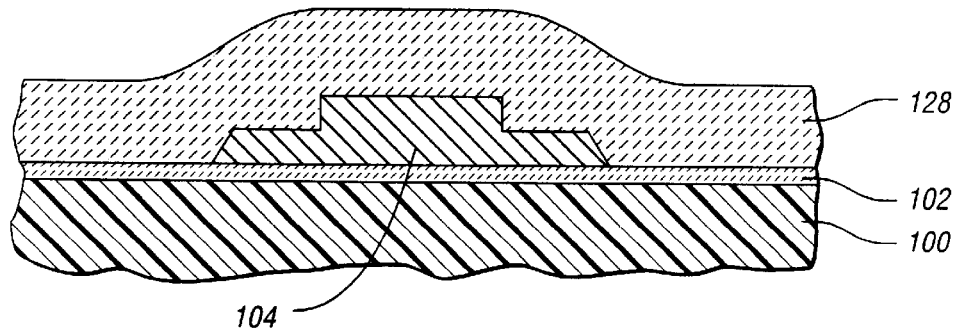
FIGS. 5a, 5b, and 5c illustrate a third sequence of fabrication steps for forming a planarization layer.
Figure 5B:
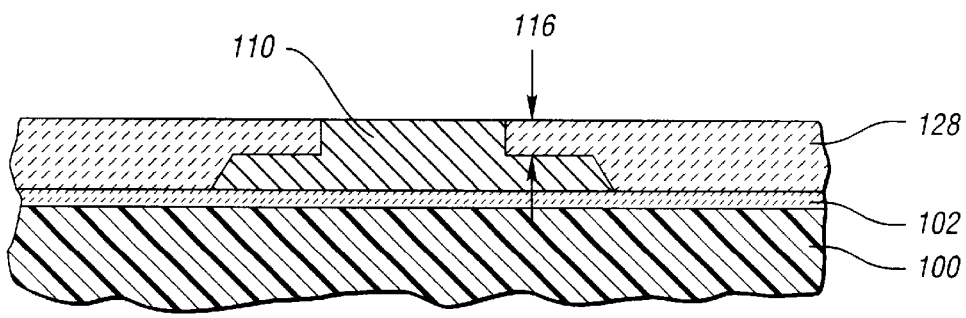
Figure 5C:
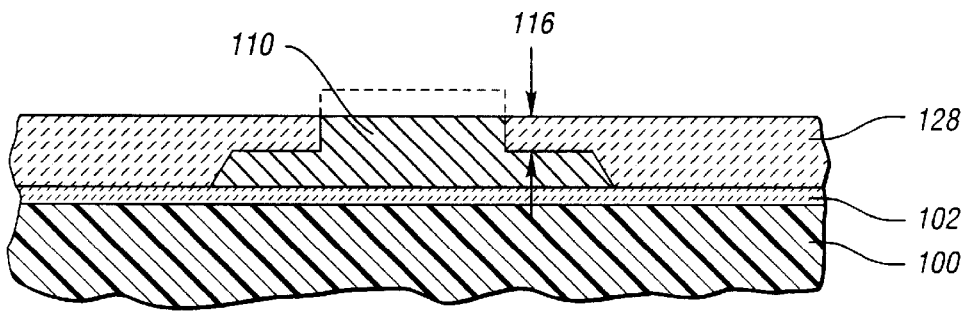

In FIG. 5A, a planarization layer 128 is deposited overlaying the bottom pole 104 and base layer. In the preferred embodiment, the planarization layer 128 is made of alumina, although other nonmagnetic electrically isolating materials could be used. The planarization layer 128 is then lapped using a chemical mechanical polishing or other compatible process to expose the upper portion 110, as shown in FIG. 5B. At this point all of the planarization layer 128 should be removed from immediately above the bottom pole 104. However, due to variations in processing and material thickness at various points on the wafer, some planarization layer 128 may remain overlaying some bottom poles 104. To ensure that all bottom poles 104 are exposed, lapping is continued to remove a small amount of the bottom poles 104, as shown by the phantom line in FIG. 5C. This produces a good surface to form a gap layer 130 (shown in FIG. 2).

Initially, the upper portion 110 of the bottom pole 104 is milled to the upper portion thickness 116 having the target value. Lapping reduces the upper portion thickness 116 to a final value. Ideally, the upper portion thickness 116 should be at least twice as large as the thickness of the gap layer 130. This allows the upper portion 110 of the bottom pole 104 to dominate the write track width characteristics of the magnetic transducer. If the upper portion thickness 116 were significantly smaller than twice the gap layer thickness, then magnetic fringe fields associated with the lower portion 118 of the bottom pole 104 would help widen the track width written in the magnetic media.

At this point in the fabrication process, the upper portion width 114 is measured to determine if the actual upper portion width is in compliance with a predetermined dimension and tolerance. The predetermined dimension for the upper portion width 114 is generally on the order of less than twenty micrometers. Tolerance for the predetermined dimension may be less than one-half micrometer when ion milling is used to form the upper portion 110. Where the actual upper portion width is found in tolerance, then the fabrication process continues. Where the actual upper portion width is found out of tolerance, then the fabrication process is stopped. Here, the bottom poles 104 and planarization layer 128 are stripped and the process started over. This process allows errors in the upper portion width 114 to be detected early in the fabrication cycle thus reducing wasted costs associated with completing the fabrication steps before the error is found.

Figure 6:
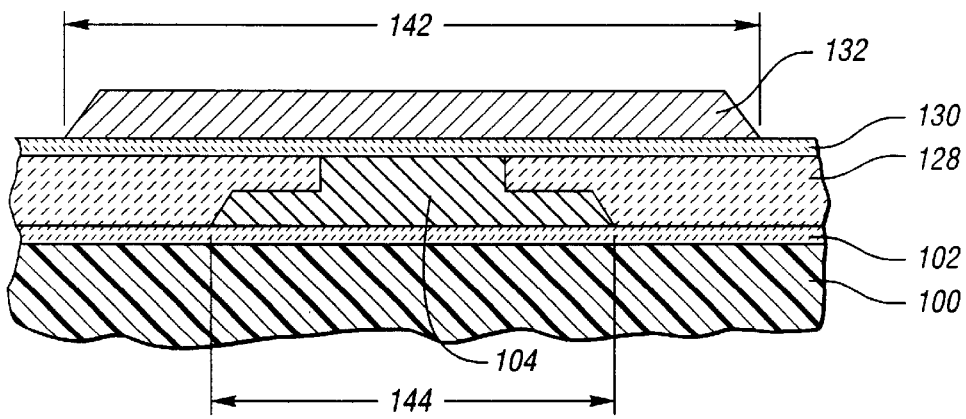
FIG. 6 is a second profile of the top pole and the bottom pole as seen from the media bearing surface.

Referring to FIG. 6 and FIG. 2, gap layer 130 is deposited on the wafer overlaying the bottom pole 104 and planarization layer 128. Gap layer 130 is typically, but not necessarily, a sputtered alumina material deposited to a thickness of approximately 0.65 micrometers. The gap layer 130 forms a write gap or break in the magnetic yoke formed by the bottom pole 104 and the top pole 132. A write signal induced in the magnetic yoke generates fringe magnetic fields across the gap at a media bearing surface 133. (The media bearing surface 133 is commonly called an air bearing surface in hard disk applications, and a tape bearing surface in magnetic tape applications.) These fringe magnetic fields write data to a magnetic media (not shown). Gap layer 130 is patterned to open a back gap via 134 that allows the top pole 108 to connect with the bottom pole 104 completing the magnetic yoke structure.

A coil 136 is then formed on the gap layer 130. Most of the coil 136 is then covered by a coil insulating layer 138. The coil insulating layer 138 is patterned so as not to cover the gap layer 130 in the zero throat region 112, the back gap via 134 where the top pole 108 and bottom pole 104 connect, and the ends of the coil 136. The coil insulating layer 138 provides electrical isolation between individual windings of the coil 136 and the top pole 132. Electrical isolation between the coil 136 and the bottom pole 104 is provided by the gap layer 130. In the preferred embodiment, the coil 136 is made of copper plated in the presence of a photoresist mask (not shown). Other electrical conductors such as gold, and other deposition and patterning methods may also be used to form the coil 136. In an alternative embodiment, an insulating layer (not shown) may be deposited on the gap layer 130 and patterned prior to forming the coil 136. This insulating layer provides an enhanced level of electrical isolation between the coil 136 and bottom pole 104.

Next, another cleaning is performed to insure the gap layer 130 in the zero throat region 112 is clear of any residue from the previous process steps. This cleaning is followed by a deposition of a top pole layer 140. Top pole layer 140 is usually, thought not necessarily, the same magnetic material as used to form the bottom pole 104. In the preferred embodiment, the top pole layer 140 is a layer of CZT deposited by sputtering to a thickness of approximately three to five micrometers.

A photoresist mask (not shown) is then deposited, exposed, and developed over the top pole layer 140. This photoresist mask is used to define the shape of the top pole 132 during a subsequent etch. The resulting top pole 132 has a top pole width, as indicated by line 142, that is greater than a lower portion width, as indicated by line 144, that in turn is greater than the upper portion width 114. This gives the magnetic transducer the appearance of having inverted poles where the smaller of the two poles is between the larger pole and the substrate 100. One advantage of fabricating a wide top pole 132 is that the top pole layer 140 can be deposited to a smaller thickness than traditionally narrow top poles. This is because the magnetic flux at the top pole 132 is spread out over a larger area longitudinally thus reducing the probability of saturating the magnetic material in any given region.

Various deposition and patterning processes may be used to create the top pole layer 140. For example, sputtering, evaporation, chemical vapor deposition and other deposition process known in the art may be used to establish the top pole layer 140. Patterning methods such as lift off, focused ion beam milling and other patterning methods known in the art may be used to define the top pole layer 132.

When formation of the top pole 132 has been completed, an overcoat layer 146 is deposited to a thickness ranging between ten and fifty micrometers, as shown in FIG. 2. The overcoat layer 146 is typically made of alumina material. After deposition, the overcoat layer 146 is lapped flat to prepare the uppermost surface for formation of bonding pads (not shown).

Each magnetic write transducer on the wafer is then electrically tested to identify operational and non-operational transducers. Next, individual transducers or arrays of transducers, depending upon the desired configuration, are cut from the wafer. For magnetic tape applications, the transducers are then mounted with a top closure 148. Finally, the media bearing surface 133 is lapped to produce a finished surface. During this final lapping step, the resistance of the resistive elements formed in the lapping strap seedlayer are monitored to determine how far the lapping has encroached on the zero throat region 112.

The process described above may also be used to fabricate a combined thin film magnetic read-write transducer where the read element is a magnetoresistive film or a giant magnetoresistive film. Magnetoresistive film and giant magnetoresistive film magnetic read transducer structures normally consist of a magnetically sensitive film disposed between insulating layers that in turn are flanked by magnetic shields. The process for fabrication a combined thin film magnetic read-write transducer begins with the process for fabricating the magnetic read transducer and then transitions into the magnetic write transducer process. It is common for the insulating layer and shield layer above the magnetically sensitive film to double as the base layer 102 and bottom pole 104 of the magnetic write transducer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A thin film magnetic transducer comprising:
   a gap layer in a zero throat region;
   a top pole disposed adjoining the gap layer in the zero throat region, the top pole having a top pole width in the zero throat region; and
   a bottom pole disposed adjoining the gap layer in the zero throat region on a side of the gap layer opposite the top pole, the bottom pole having an upper portion adjoining the gap layer and a lower portion, the upper and lower portions of the bottom pole forming a continuous layer of the same magnetic material, the upper portion having an upper portion width in the zero throat region, the lower portion having a lower portion width in the zero throat region, the lower portion width being greater than the upper portion width and smaller than the top pole width.

2. The magnetic transducer of claim 1 wherein the gap layer has a gap thickness and the upper portion of the bottom pole has an upper portion thickness, the gap layer and the upper portion of the bottom pole being arranged so that the upper portion thickness is at least twice as thick as the gap thickness.

3. The magnetic transducer of claim 1 further comprising:
   a base disposed adjacent the bottom pole on a side opposite the gap layer; and
   a planarization layer disposed between the base and the gap layer.

4. The magnetic transducer of claim 3 further comprising a coil disposed adjoining the gap layer on a same side of the gap layer as the top pole.

* * * * *